United States Patent [19]

Ijyuin et al.

[11] Patent Number: 5,147,697
[45] Date of Patent: Sep. 15, 1992

[54] POLYVINYL CHLORIDE PIPE FOR THE INNER LINING OF EXISTING PIPES

[75] Inventors: Makoto Ijyuin, Osakashi; Akihiko Tsuda, Neyagawashi; Shinichi Nawata, Kitakatsuragigun, all of Japan

[73] Assignee: Tsutsunaka Plastic Kogyo Kabushiki Kaisha, Osaka, Japan

[21] Appl. No.: 670,689

[22] Filed: Mar. 18, 1991

[30] Foreign Application Priority Data

Mar. 26, 1990 [JP] Japan .................................. 2-77476
Mar. 26, 1990 [JP] Japan .................................. 2-77477

[51] Int. Cl.$^5$ ........................................... F16L 55/162
[52] U.S. Cl. .................................... 428/36.6; 428/35.4; 428/36.91; 428/463; 428/522; 138/97; 138/141; 138/153; 138/DIG. 7; 138/98
[58] Field of Search .............. 428/35.3, 35.4, 36.6, 428/36.92, 522, 463, 36.91; 525/227, 84, 239; 138/97, 143, 141, DIG. 7, 153

[56] References Cited

U.S. PATENT DOCUMENTS

| | | | |
|---|---|---|---|
| 3,652,483 | 3/1972 | Tanaka | 525/84 |
| 3,975,315 | 4/1976 | Parks | 525/227 |
| 4,267,084 | 5/1981 | Mizutani | 525/227 |
| 4,536,548 | 8/1985 | Stützel | 525/227 |
| 4,668,740 | 5/1987 | Okano | 525/227 |
| 4,751,118 | 6/1988 | Wypart | 428/36.6 |
| 4,959,416 | 9/1990 | Sun | 525/239 |
| 5,048,174 | 9/1991 | McGuire | 138/97 |

FOREIGN PATENT DOCUMENTS 807413 6/1956 United Kingdom .

Primary Examiner—Ellis P. Robinson
Assistant Examiner—Rena L. Dye
Attorney, Agent, or Firm—Tilton, Fallon, Lungmus & Chestnut

[57] ABSTRACT

A polyvinyl choride resin pipe serves as an inner lining material for the existing pipes. The resin pipe is formed of a resin composition which comprises as a main component either a polyvinyl chloride having a degree of polymerization $\overline{DP}$ of 600 to 1,050, or a mixture of 40 to 60% by weight of a polyvinyl chloride having a lower average degree of polymerization $\overline{DP}_L$ of 400 to 600 and 60 to 40% by weight of another polyvinyl chloride having a higher average degree of polymerization $\overline{DP}_H$ of 1,050 to 1,350. The resin composition further comprises 3 to 25 parts by weight of a modifying agent blended with 100 parts by weight of the main component. The modifying agent is composed of MMA- and/or MBS-modifiers.

6 Claims, 1 Drawing Sheet

POLYVINYL CHLORIDE PIPE FOR THE INNER LINING OF EXISTING PIPES

BACKGROUND OF THE INVENTION

1. Field of the Invention

The invention relates to a polyvinyl chloride resin pipe as a material for the inner lining of existing pipes, and more particularly, to a polyvinyl chloride resin pipe serving as an inner lining layer of existing (metal) pipes, wherein the resin pipe is to be inserted in the existing pipes after they have been installed in underground space or in the building body, and wherein the existing pipes serving as a conduit for power source cables, communication wirings or the like are repaired or reinforced by means of such a lining.

2. Description of Prior Art

Those existing pipes are apt to sustain unexpected cracks or injuries due to corrosion which will occur in course of time, or due to external pressure imparted to the pipes from surrounding objects Such injured underground pipes will cause a problem such as short circuit, leakage of electricity and breakage of the power source cables or communication wirings, if underground water penetrates into the injured pipes. It is very difficult to replace such existing or established pipes with new pipes since they are located underground below the building or inside the building body.

Therefore, public attention has been attracted to the inner lining method for repairing or reinforcing the existing pipes, which method was proposed recently and in which method a synthetic resin pipe is inserted in the already installed pipes so as to form an inner lining layer therein. According to this inner lining method as described in Japanese Patent Publication Kokai No. 1-295828, a thermoplastic resin pipe whose outer diameter is smaller than the inner diameter of existing pipe is heated to soften and inserted into the existing pipe. Then, compressed hot steam is introduced into the resin pipe in order to charge an internal pressure. The steam expands the resin pipe in its radial direction, so that the resin pipe is secured close to the inner surface of existing pipe. Finally, the resin pipe is cooled down to solidify, by means of an appropriate cooling medium.

A resin pipe formed of rigid polyvinyl chloride resin which has the average degree of polymerization ($\overline{DP}$) of about 1,100 to 1,300 has been considered and tried for use as the resin pipe for the inner lining. This type of resin pipe has been widely used to construct the underground pipe line, from the viewpoint of material cost, durability and thermal stability of dimension.

However, it has been recognized that the pipe of rigid polyvinyl chloride resin brings about the following problems when it is heated and inflated by means of heating medium.

The outer diameter of the resin pipe used as the inner lining may usually be about 50 to 95% of the inner diameter of the existing pipe. It is preferable, however, that the outer diameter of resin pipe as the inner lining is designed so small as to be easily inserted into the existing pipe. In this case, the resin pipe must be of a high elongation ensuring diametrical expansion when heated. If steam is introduced into the polyvinyl chloride resin pipe in order to heat and soften the resin, then some inner portions of pipe will be covered inevitably with condensed water and be hindered from being sufficiently heated. On the other hand, some other portions adhering close to the inner surface of existing pipe will be cooled down by the existing pipe itself which absorbs heat. As a result, temperature distribution ranging from 75° to 95° C. will be brought about in the resin pipe. Though any temperatures within this range are not lower than the softening temperature of polyvinyl chloride, such a variance of the temperature will produce unequal wall thickness of the expanded resin pipe, because the peripheral portions of the pipe wall are expanded outwardly in an ununiformed manner. In addition, local excessive expansion will also produce a crack called "burst" of the pipe wall.

Moreover, as another problem, the resin pipe for the inner lining undergoes thermal shrinkage in both the radial and longitudinal directions during the cooling process which is carried out after the heat expansion process of the lining operation. Thus, the radial shrinkage must be prevented by means of the pressure imparted to the inner surface of the resin pipe, whereas the longitudinal shrinkage must be prevented by fixing both ends of the resin pipe to the ends of existing pipe. However such a forcible restriction of shrinkage will inevitably cause the internal strain to remain within the wall of resin pipe, thereby significantly impairing its anti-earthquake and anti-shock strength.

OBJECTS AND SUMMARY OF THE INVENTION

An object of the present invention is therefore to provide a polyvinyl chloride resin pipe as the inner lining material for the existing pipes, which pipe can be expanded uniformly and suitably within the practical temperature range during the lining operation even if such a great variance of temperature as described above were observed. In other words, the object is to provide such a polyvinyl chloride pipe whose wall thickness can be uniform even after a sufficient expansion so that the burst is avoided to improve and make easier the assembly.

Another object of the invention is to provide a polyvinyl chloride pipe as the inner lining material, which pipe is highly earthquake-proof owing to quick relaxation of the residual internal strain which will remain for a time after assembly.

The present inventors have discovered, as a result of much research and study, that the objects can be achieved either by employing a polyvinyl chloride resin whose degree of polymerization is significantly lower than that of common polyvinyl chloride resin pipe, or by employing a mixture of two grades of polyvinyl chloride resins whose degrees of polymerization respectively fall within different ranges from each other, wherein a particular modifying agent is added to the resin or to the mixture of resins.

From a first aspect of the invention, the polyvinyl chloride pipe as the inner lining material is formed of a resin composition which comprises: 100 parts by weight of polyvinyl chloride having an average degree of polymerization ($\overline{DP}$) ranging from 600 to 1,050, as a main component; and 3 to 25 parts by weight of the modifying agent comprising a methyl methacrylate (MMA) polymer and/or butadiene-styrene-methyl methacrylate (MBS) copolymer.

From a second aspect of the invention, the polyvinyl chloride pipe as the inner lining material is formed of a resin composition which comprises: 100 parts by weight of a mixture of low and high polymerization polyvinyl chloride resins, as a main component, the resins having average degrees of polymerization ($\overline{DP}_L$ and $\overline{DP}_H$) ranging from 400 to 600 and ranging from 1,050 to 1,350, respectively; and 3 to 25 parts by weight of the modifying agent comprising a methyl methacrylate (MMA) polymer and/or butadiene-styrene-methyl methacrylate (MBS) copolymer, wherein the mixture is composed of 40 to 60% by weight of the low polymerization resin and 60 to 40% by weight of the high polymerization resin.

As will become apparent from the embodiments of the invention described hereinafter, the polyvinyl chloride resin pipes which may be provided according to the first or second aspect of the invention can be expanded uniform and suitably within the practical temperature range during the lining operation even with the aforementioned great variance of heated temperatures. Accordingly, the wall thickness of polyvinyl chloride pipe is maintained uniform even after sufficient expansion thereof which is accompanied by somewhat significant variance of temperature around the periphery of the pipe, the expansion being caused by introduction of compressed steam into the resin pipe, as already described above. Any local and excessive expansion can thus be prevented to avoid the undesirable burst of pipe wall, thereby enhancing to the construction works a wider allowable range of operation conditions including temperature condition. The lining operation is thus made easier and improved to produce defect-free linings within the existing pipes.

Particularly, the polyvinyl chloride pipe offered according to the second aspect of the invention is advantageous in that any internal stress or strain caused by the lining operation and remaining in the pipe wall can be relaxed or absorbed in a relatively short time. The polyvinyl chloride pipe can therefore provide the inner lining of a highly earthquake-proof tenacity and anti-shock strength to thereby improve the durability and safety of said lining.

DETAILED DESCRIPTION OF THE INVENTION

First Embodiment

The polyvinyl chloride resin according to a first embodiment is produced by homopolymerization of vinyl chloride monomer. If $\overline{DP}$ of this resin is below 600, then its strength, in particular its anti-shock strength (i.e., IZOD strength) will be so insufficient that the lining made of such a resin does not meet the practically required standard strength. If, contrarily, $\overline{DP}$ of the homopolymerized polyvinyl chloride resin is above 1,050, then its elongation will be insufficient at temperatures within a range from about 75° to 95° C. at which the lining operation is carried out. This resin shows poor elongation at the lower temperatures in the range so that its wall thickness is likely to become non-uniform when thermally expanded with a compressed medium. The burst of pipe wall will also take place in the worst case. According to the inventors' study, the resin pipe as the lining material is to be elongated by at least 100% when it is softened by heating to 75° C. which is the lowest temperature in the range. The pipe of polyvinyl chloride resin whose $\overline{DP}$ is below 1,050 can be elongated well by 100% or more. However, $\overline{DP}$ higher than 1,100 will decrease the elongation to 70 or 80% at 75° C., thus making the resin pipe unsuited for use as the lining material. In summary, the most preferable $\overline{DP}$ range of the polyvinyl chloride is 650 to 950 in the invention.

The modifying agent which is added to the main component is indispensable to sufficient elongation and strength of the polyvinyl chloride resin. Among the known various modifiers for this resin, those modifying agents which are called MMA or MBS modifiers can be used here solely or in combination. The MMA modifier is a multi-component resin comprising monomers such as methyl methacrylate, styrene, acrylonitrile or the like which are graft-polymerized to a copolymer rubber composed mainly of acrylic ester. The MBS modifier is a copolymer of butadiene, styrene and methyl methacrylate. Either of the MMA and MBS modifiers, or both of them in combination, may be employed to successively improve the elongation and strength. It is noted however that MBS modifier can not necessarily improve to a sufficient degree the weather resistance of resin pipe. From this point of view, MMA modifier is more preferable. Other substances called CPE (i.e., chlorinated polyethylene) modifier, EVA (ethylene-vinyl acetate copolymer) modifier, or ABS (acrylonitrile-butadiene-styrene copolymer) modifier are also known in the art as the modifying agents for polyvinyl chloride resin. Those modifiers are however less preferable since they cannot improve the elongation at the temperatures of lining operation, or they can do so merely to unsatisfactory degree.

In a case wherein the resin composition contains less than 3 parts by weight of the modifying agent for 100 parts by weight of the polyvinyl chloride resin, the strength of the resin pipe is not enough for practical use thereof. Elongation of that pipe is also not sufficiently improved at the temperatures of the lining operation. More than 25 weight parts of the modifying agent in said resin composition will, however, scarcely improve the elongation and strength beyond a certain degree. Rather, rigidity of the resin pipe will be undesirably reduced due to such a superfluous content of the modifying agent. Its most preferable content is from about 6 to 20 parts by weight for 100 parts by weight of polyvinyl chloride resin.

It is a matter of course that the polyvinyl chloride resin composition may further contain some usual ingredients such as stabilizer, lubricant, pigment, colorant or the like. The kinds or types and contents of these ingredients are not restricted but can be selected according to the conventional or common methods of producing the resin pipes. About 1.0 to 3.0 parts by weight of a lead compound, organic tin compound or metallic soap may be added as the stabilizer, solely or in any combination thereof. Further, about 0.5 to 1.5 weight parts of the lubricant and about 0.5 weight parts or less of tin dioxide as a filler or the same parts of colorant may also be blended with the resin composition.

The resin pipe in the invention can be manufactured by the conventional extrusion molding method, under any appropriate process conditions which are not restricted to any particular ones.

Second Embodiment

Two types of polyvinyl chloride resins of different $\overline{DP}$ are combined in a second embodiment so as to serve as the main component of the resin pipe. Its elongation property at the lining operation temperatures (ca. 75° to 95° C.) is made better owing to this composition, with the internal stress and strain being thereby relaxed thoroughly or diminished rapidly in a short time. Average DP, that is $\overline{DP}_L$ and $\overline{DP}_H$, of the respective polyvinyl chlorides are to be included in the aforementioned ranges for the reasons summarized here. If $\overline{DP}_L$ of the polyvinyl chloride of lower polymerization degree is below 400, then the resin pipe is hardly shock-resistant. $\overline{DP}_L$ above 600 will however make inferior the elongation property so that the resin pipe wall tends to burst and break when heated and expanded. If, on the other hand, $\overline{DP}_H$ of the other polyvinyl chloride of higher polymerization degree is below 1,050, then mechanical strength of the resin pipe will become worse to an allowable degree. $\overline{DP}_H$ above 1,350 causes an insufficient elongation at the lining operation temperatures whereby workability of the resin pipe becomes poorer.

The inventors prepared the resin compositions by variously combining the two types of polyvinyl chloride resins of higher and lower degrees of polymerization, wherein some species of the resins of different $\overline{DP}$ were employed for each type. Those resin compositions were tested to determine their average elongation at 80° C. and relaxation property as listed in Table 1.

TABLE 1

| Example Nos. | Polyvinyl chloride resins $\overline{DP}_L:\overline{DP}_H$ = Blend ratio | Elongation at 80° C. (%) | Residual internal stress (%) after 100 Hrs |
|---|---|---|---|
| 1 | 400:1,050 = 4:6 | 120 | 20 |
| 2 | 600:1,300 = 6:4 | 110 | 24 |
| 3 | 400:1,200 = 5:5 | 140 | 27 |
| 4 | 400:1,400 = 5:5 | 70 | 48 |
| 5 | 400:800 = 2:8 | 100 | 40 |

As will be seen from Table 1, Examples 1 to 3 comprise the two types of polyvinyl chlorides which are respectively of the polymerization degrees defined in the invention and are blended with each other at the ratios also specified in the invention. Examples 4 and 5 depart from the scope of the invention since they comprise polyvinyl chlorides whose polymerization degrees and/or blend ratios do not fall within the ranges set forth in the invention. The Examples 1 to 3 proved to be better than Example 4 and 5 with respect to elongation at 80° C. which is relatively low temperature for the lining operation. Residual internal stress of the resins according to Examples 1 to 3 is significantly diminished in comparison with Examples 4 and 5. It was thus found that the most preferable ranges of $\overline{DP}_L$ and $\overline{DP}_H$ are 450 to 550, and 1,100 to 1,200, respectively.

Regarding the blend ratio of the two polyvinyl chloride resins, more than 60% by weight of the resin of lower polymerization degree will remarkably reduce the mechanical strength of the resin pipe, while less than 40% by weight of said resin will make it difficult for the resin pipe to be expanded uniform at the lining operation temperatures. Thus, the most preferable range of blend ratio of the polyvinyl chloride of lower polymerization degree is about 45 to 55% by weight.

As for the blending of modifying agent, lubricant, stabilizer, pigment and the likes, the same remarks as in the first embodiment apply to this second embodiment so that their details are not repeated here.

EXAMPLES

# Examples of First Embodiment

Figure 1:
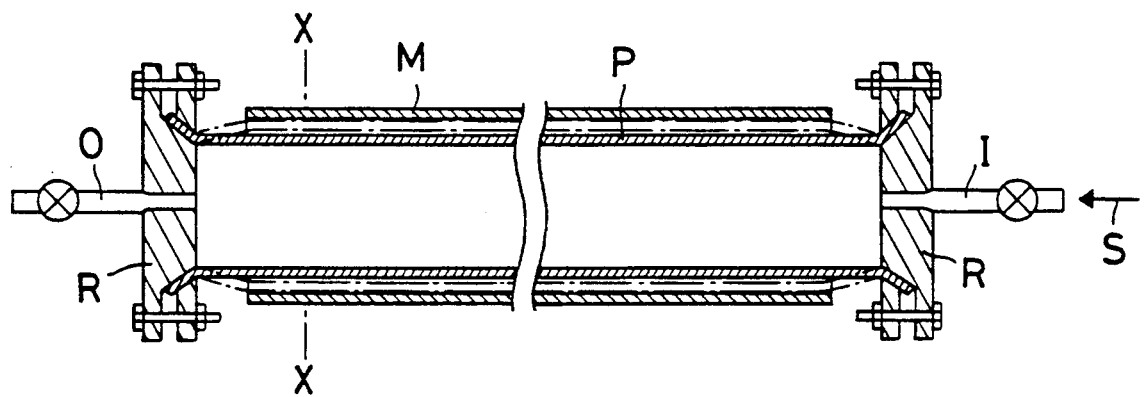
FIG. 1 is a cross-sectional view schematically showing an instrument used to carry out expansion tests of various resin pipes as the lining material.

Resin compositions as shown on Tables 2 and 3 were extruded through a die assembly to form polyvinyl chloride pipes having a diameter of 123 mm and wall thickness of 4.0 mm (tolerance thereof being ±1.0% or less).

TABLE 2

| Ingredients | Content (parts by weight) |
|---|---|
| Polyvinyl chloride (its DP given on Table 3) | 100 |
| Modifying agent (MMA, MBS or CPE modifier) | See Table 3. |
| Stabilizer (octyl tin mercaptide, and octyl tin maleate) | 2.5 |
| Lubricant (calcium stearate) | 0.3 |
| Pigment (titanium dioxide) | 0.5 |
| Colorant | a little |

Each polyvinyl chloride pipe "P" prepared as mentioned above was mounted on the instrument in FIG. 1 in such a manner that two such pipes were inserted respectively into standard metal pipes "M" corresponding to an existing pipe and having an inner diameter of 150 mm (for diametrical expansion of the resin pipe "P" by 20%) or of 185 mm (for diametrical expansion by 50%). Clamping plugs "R" having a steam inlet "I" or steam outlet "O" were used to close both ends each resin pipe "P". Steam "S" heated to 111° C. was charged through the inlet "I" at 0.5 kg/cm² (gauge pressure). Each resin pipe "P" was thus heated and inflated by steam so that its outer peripheral surface closely engaged with inner peripheral surface of the metal pipe "M". After maintaining this state for two hours, the resin pipe was cooled down by compressed air blown therethrough.

Subsequently, the resin pipe "P" was removed from the metal pipe "M". Resin pipe samples which were inflated in the metal pipe "M" having the diameter of 150 mm (for diametrical expansion by 20%) were then subjected to measurement of wall thickness distribution or variance in the circumferential direction, the measurement being done as to a portion indicated by the line X—X.

Other resin pipe samples which were inflated in the metal pipe "M" having the diameter of 185 mm (for diametrical expansion by 50%) were subjected to visual inspection of steam leakage during the inflation process. Visual inspection of the pipe wall burst was also executed on these samples after said inflation process.

Further, elongation at 80° C. was determined for all of the resin compositions referred to above. Results of these performance tests are listed on Table 3.

TABLE 3

| Example Nos. | Polyvinyl chloride (DP) | Modifying agent Type | Modifying agent Cont. (PHR) | Wall thickness variance (%) (expn. by 20%) | Burst of pipe wall (expn. by 50%) | Elong. at 80° C. (%) |
|---|---|---|---|---|---|---|
| Invention | | | | | | |
| 1 | 650 | MMA | 3 | 12 | None | 250 |
| 2 | 650 | MMA | 10 | 10 | None | 320 |
| 3 | 800 | MMA | 5 | 17 | None | 220 |
| 4 | 950 | MBS | 10 | 15 | None | 230 |
| 5 | 800 | MMA | 18 | 13 | None | 250 |
| Reference | | | | | | |
| 6 | 400 | MMA | 2 | 13 | Some | 150 |
| 7 | 1,350 | MMA | 15 | 41 | Some | 110 |
| 8 | 1,400 | MMA | 20 | 38 | Some | 120 |
| 9 | 800 | CPE | 10 | 47 | Some | 90 |

Notes:
"Cont. (PHR)" = Content "per hundred parts of resin";
"expn." = expansion;
"Elong" = elongation;
Used as modifier "MMA" is "Kane-Ace FM" (trademark) produced by KANEGAFUCHI CHEMICAL INDUSTRY Co., Ltd.;
Used as modifier "MBS" is "Kane-Ace B56" (trademark) produced by KANEGAFUCHI CHEMICAL INDUSTRY Co., Ltd.;
Used as modifier "CPE" is "Chlorinated polyethylene 301A" (trademark) produced by SHOWA DENKO Co., Ltd.

As seen from Table 3, it is apparent that the resin pipe samples made of the polyvinyl chloride composition in the invention can be elongated in much better manner than those made as the references, at 80° C. which is a comparatively low temperature for the lining operation. This is well supported by a fact that the resin pipes as the lining material in the invention less likely to produce non-uniform wall thickness when heated and inflated. In other words, they are inflated uniformly in their circumferential direction even if they are expanded to an extreme extent, for instance to 50% expansion in diameter. The inner linings of the existing pipes can be safely and exactly conducted using the rein pipes provided in the invention.

Examples of Second Embodiment

Resin compositions as shown on Tables 4 and 5 were similarly extruded to form polyvinyl chloride pipes having a diameter of 123 mm and wall thickness of 4.0 mm (tolerance thereof being ±1.0% or less).

Each polyvinyl chloride pipe "P" prepared as mentioned above was also mounted on the instrument in FIG. 1 in the same manner as in the first embodiment so as to carry out similar lining tests of the "inflation in metal pipe" type.

The inflated and cooled resin pipes "P" were removed from the metal pipes "M" in order to provide resin pipe samples.

TABLE 4

| Ingredients | Content (parts by weight) |
|---|---|
| Polyvinyl chlorides (their DP and blend ratios given on Table 5) | 100 |
| Modifying agent (MMA, MBS or CPE modifier) | See Table 5. |
| Stabilizer (octyl tin mercaptide, and octyl tin maleate) | 2.5 |
| Lubricant (calcium stearate) | 0.3 |
| Pigment (titanium dioxide) | 0.5 |
| Colorant | a little |

The resin pipe samples which were inflated in the metal pipe "M" having the diameter of 150 mm (for diametrical expansion by 20%) were then subjected to measurement of wall thickness distribution or variance in the circumferential direction, the measurement being done as to a portion indicated by the line X—X.

The other resin pipe samples which were inflated in the metal pipe "M" having the diameter of 185 mm (for diametrical expansion by 50%) were subjected to visual inspection of steam leakage during the inflation process. Visual inspection of the pipe wall burst was also executed on these samples after said inflation process.

Further, elongation was determined for all of the resin compositions within an atmosphere heated to 80° C. according to the JIS K-6742 method. Residual internal strain (%) of the abovementioned samples was measured by elongating them by 0.5% after this elongated state had been maintained for 100 hours.

Results of these performance tests are listed on Table 5. As seen from Table 5, it is apparent that the resin pipe samples made of the polyvinyl chloride composition in the second embodiment of the invention can be elongated better so that the resin pipes as the lining material are less likely to produce non-uniform wall thickness when heated and inflated. In other words, they are inflated uniformly in their circumferential direction even if they are expanded to an extreme extent, for instance to 50% expansion in diameter. The inner linings of the existing pipes can be safely and exactly improved using the resin pipes provided in the invention. Furthermore, the resin pipes made of the polyvinyl chloride resin composition in the second embodiment are advantageous also in that the residual internal stress and strain are well relaxed in course of time and their anti-shock tenacity is improved to a sufficient degree.

The above embodiments are not limitative of the invention which is limited only to the scope defined with the claims, because there may be employed various modifications without departing from said scope.

TABLE 5

| Example Nos. | Polyvinyl chlorides $\overline{DP}_L:\overline{DP}_H$/Ratio | Modifying agent Type | Modifying agent Cont. (PHR) | Wall t. variance (%) (*1) | Burst of p. wall (%) (*2) | Elong. at 80° C. (%) | Residual i. stress (%) (*3) |
|---|---|---|---|---|---|---|---|
| Invention | | | | | | | |
| 1 | 400:1,050/4:6 | MMA | 3 | 9 | None | 210 | 20 |
| 2 | 600:1,350/6:4 | MMA | 3 | 8 | None | 230 | 23 |
| 3 | 400:1,350/5:5 | MMA | 3 | 8 | None | 240 | 27 |
| 4 | 400:1,050/4:6 | MMA | 18 | 7 | None | 300 | 18 |
| 5 | 600:1,350/6:4 | MMA | 18 | 5 | None | 310 | 20 |
| 6 | 400:1,350/5:5 | MMA | 18 | 5 | None | 310 | 25 |
| Reference | | | | | | | |
| 1 | 400:1,400/5:5 | MMA | 18 | 23 | Some | 190 | 35 |
| 2 | 400:1,400/5:5 | CPE | 10 | 31 | Some | 80 | 43 |
| 3 | 400:1,050/4:6 | MMA | 2 | 40 | Some | 170 | 20 |

Notes:
"t." = thickness;
(*1) = expansion by 20%;
"p." = pipe;
(*2) = expansion by 50%;
"i." = internal;
(*3) = after 100 hours;
"Cont. (PHR)" = Content "per hundred parts of resin";
"Elong." = elongation; and the same modifiers "MMA", "MBS" and "CPE" as those on Table 3 were used.

What is claimed is:

1. In combination, an installed pipe and a polyvinyl chloride resin pipe as an inner lining therefor wherein the resin pipe is heated without mechanical deformation to soften the same, inserted into the installed pipe, further heated and inflated therein to closely engage with the inner surface of the installed pipe, said polyvinyl chloride resin pipe being formed of a resin composition which consists essentially of polyvinyl chloride as a main component and a modifying agent blended therewith, the polyvinyl chloride having an average degree of polymerization $\overline{DP}$ included in a range of 600 to 1,050, and 3 to 25 parts by weight of said modifying agent being blended with 100 parts by weight of said main component, said modifying agent being a member selected from the class consisting of MMA- and MBS-modifiers which are a polymer of methyl methacrylate and a copolymer of butadiene-styrene-methyl methacrylate, respectively.

2. The combination as defined in claim 1, wherein the average degree of polymerization $\overline{DP}$ is 650 to 950.

3. The combination as defined in claim 1 or 2, wherein 6 to 20 parts by weight of the modifying agent is blended with 100 parts by weight of the polyvinyl chloride.

4. In combination, an installed pipe and a polyvinyl chloride resin pipe as an inner lining therefor wherein the resin pipe is heated without mechanical deformation to soften the same, inserted into the installed pipe, further heated and inflated therein to closely engage with the inner surface of the installed pipe, said polyvinyl chloride resin pipe being formed of a resin composition which consists essentially of a main component which is a mixture of 40 to 60% by weight of a polyvinyl chloride having a lower average degree of polymerization $\overline{DP}_L$ of 400 to 600 and 60 to 40% by weight of another polyvinyl chloride having a higher average degree of polymerization $\overline{DP}_H$ of 1,050 to 1,350, and 3 to 25 parts by weight of a modifying agent blended with 100 parts by weight of said main component, said modifying agent being a member selected from the class of MMA- and MBS-modifiers which are a polymer of methyl methacrylate and a copolymer of butadiene-styrene-methyl methacrylate, respectively.

5. The combination as defined in claim 4 wherein the average degrees of polymerization $\overline{DP}_L$ and $\overline{DP}_H$ are included in ranges of 450 to 550 and of 1,100 to 1,200, respectively.

6. The combination as defined in claim 4 or 5, wherein 6 to 20 parts by weight of the modifying agent is blended with 100 parts by weight of the mixture of polyvinyl chlorides.

* * * * *